(12) United States Patent
Phillips et al.

(10) Patent No.: US 9,002,139 B2
(45) Date of Patent: Apr. 7, 2015

(54) METHODS AND SYSTEMS FOR AUTOMATED IMAGE SLICING

(75) Inventors: Matt J. Phillips, Champaign, IL (US); David C. Stephens, Shoreline, WA (US)

(73) Assignee: Adobe Systems Incorporated, San Jose, CA (US)

(*) Notice: Subject to any disclaimer, the term of this patent is extended or adjusted under 35 U.S.C. 154(b) by 1053 days.

(21) Appl. No.: 13/028,470

(22) Filed: Feb. 16, 2011

(65) Prior Publication Data

US 2014/0286578 A1  Sep. 25, 2014

(51) Int. Cl.
| | |
|---|---|
| G06K 9/36 | (2006.01) |
| G06K 9/32 | (2006.01) |
| H04N 1/40 | (2006.01) |

(52) U.S. Cl.
CPC ............ G06K 9/325 (2013.01); H04N 1/40062 (2013.01)

(58) Field of Classification Search
USPC .................................................. 382/173–180
See application file for complete search history.

(56) References Cited

U.S. PATENT DOCUMENTS

| | | | |
|---|---|---|---|
| 5,555,362 | A | 9/1996 | Yamashita et al. |
| 5,680,479 | A | 10/1997 | Wang et al. |
| 5,737,442 | A | 4/1998 | Alam |
| 5,845,303 | A | 12/1998 | Templeman |
| 5,893,127 | A | 4/1999 | Tyan et al. |
| 5,911,145 | A | 6/1999 | Arora et al. |
| 6,003,048 | A | 12/1999 | Fallside |
| 6,023,714 | A | 2/2000 | Hill et al. |
| 6,336,124 | B1 | 1/2002 | Alam et al. |
| 6,589,291 | B1 | 7/2003 | Boag et al. |
| 6,766,495 | B1 | 7/2004 | Bates et al. |
| 6,771,816 | B1 * | 8/2004 | Gaither .......................... 382/176 |
| 6,964,017 | B1 | 11/2005 | Meisner et al. |
| 7,117,429 | B2 | 10/2006 | Vedullapalli et al. |
| 7,246,306 | B2 | 7/2007 | Chen et al. |
| 7,278,098 | B1 | 10/2007 | Boye et al. |
| 7,383,498 | B1 | 6/2008 | Hickl et al. |
| 7,458,017 | B2 | 11/2008 | Chen et al. |
| 7,542,960 | B2 | 6/2009 | Basak et al. |
| 7,587,669 | B2 | 9/2009 | Rana |
| 7,664,727 | B2 | 2/2010 | Van Doan |
| 8,156,426 | B2 | 4/2012 | Tischer |
| 8,312,079 | B2 | 11/2012 | Newsome et al. |
| 8,438,495 | B1 | 5/2013 | Gilra et al. |

(Continued)

OTHER PUBLICATIONS

Raman, et al., "Lazy, Adaptive RID-List Intersection, and Its Application to Index Anding", ACM, 2007, pp. 773-784.

(Continued)

*Primary Examiner* — Chan Park
*Assistant Examiner* — Mark Roz
(74) *Attorney, Agent, or Firm* — Kilpatrick Townsend & Stockton LLP

(57) ABSTRACT

A computer-implemented method can comprise accessing a plurality of pixels representing an image and identifying at least two scanlines in the plurality of pixels. By analyzing the scanlines, a computing device carrying out the method can determine if the image is suited for slicing and, if the image is suited for slicing, the device can determine a slicing strategy by analyzing pixel values of the at least two scanlines. Data indicating the slicing strategy can be used to carry out a resizing operation and/or to generate structured code based on the slicing strategy, such as HTML and CSS code to generate a resizable element corresponding to the image. The slicing strategy can be determined independent of input defining or adjusting boundaries between slices.

22 Claims, 7 Drawing Sheets

(56) References Cited

U.S. PATENT DOCUMENTS

| | | |
|---|---|---|
| 2002/0194219 A1 | 12/2002 | Bradley et al. |
| 2003/0011631 A1 | 1/2003 | Halahmi |
| 2003/0065638 A1 | 4/2003 | Robert |
| 2003/0097640 A1 | 5/2003 | Abrams et al. |
| 2003/0182627 A1 | 9/2003 | Chung et al. |
| 2003/0233620 A1 | 12/2003 | Vedullapalli et al. |
| 2004/0230901 A1 | 11/2004 | Godwin et al. |
| 2004/0239703 A1 | 12/2004 | Angelica |
| 2004/0243927 A1 | 12/2004 | Chung et al. |
| 2005/0055635 A1 | 3/2005 | Bargeron et al. |
| 2005/0268230 A1 | 12/2005 | Bales |
| 2006/0168518 A1 | 7/2006 | Tischer |
| 2006/0190437 A1 | 8/2006 | Popper |
| 2006/0259462 A1 | 11/2006 | Timmons |
| 2007/0079236 A1 | 4/2007 | Schrier et al. |
| 2007/0097138 A1 | 5/2007 | Sorotokin |
| 2007/0186157 A1 | 8/2007 | Walker et al. |
| 2007/0214239 A1 | 9/2007 | Mechkov et al. |
| 2008/0255850 A1 | 10/2008 | Cross et al. |
| 2009/0002764 A1 | 1/2009 | Atkins et al. |
| 2009/0019386 A1 | 1/2009 | Sweetland et al. |
| 2009/0228784 A1 | 9/2009 | Drieu et al. |
| 2009/0259949 A1 | 10/2009 | Verlaan et al. |
| 2009/0324079 A1 * | 12/2009 | Yuan et al. .................... 382/176 |
| 2011/0167332 A1 | 7/2011 | Nickas, Jr. |
| 2011/0173589 A1 | 7/2011 | Guttman et al. |
| 2011/0191676 A1 | 8/2011 | Guttman et al. |
| 2011/0258562 A1 | 10/2011 | Zhu et al. |
| 2012/0131441 A1 | 5/2012 | Jitkoff et al. |
| 2012/0210236 A1 | 8/2012 | Prasad |

OTHER PUBLICATIONS

Non Final Office Action in related U.S. Appl. No. 12/908,427 dated May 23, 2012, 15 pages.
Non Final Office Action in related U.S. Appl. No. 13/028,439 dated Jan. 18, 2013, 14 pages.
Non Final Office Action in related U.S. Appl. No. 12/908,429 dated Jul. 2, 2013, 27 pages.
Final Office Action for related U.S. Appl. No. 12/908,427 mailed Dec. 24, 2012 (15 pages).
Final Office Action for related U.S. Appl. No. 12/908,427 mailed Jan. 24, 2014 (18 pages).
Non-Final Office Action for related U.S. Appl. No. 12/908,427 mailed Jul. 2, 2013 (15 pages).
Final Office Action for related U.S. Appl. No. 13/028,439 mailed Oct. 25, 2013 (14 pages).
Schrier et al., "Adaptive Layout for Dynamically Aggregated Documents", ACM, 2008, pp. 99-108.

* cited by examiner

METHODS AND SYSTEMS FOR AUTOMATED IMAGE SLICING

BACKGROUND

Computer images are often resized, such as while a user is editing an image directly or resizing a document (e.g., a web page) containing one or more visual elements and/or if a visual element is to be rendered by an application that operates on different platforms having differing amounts of available screen space. For example, a vector or raster image may be divided into "slices," with each slice corresponding to a respective portion of the image. Depending on the properties of each slice, different portions of the image will behave differently when the image is resized. Typically, slices are defined by user input defining boundaries between the slices.

In particular, a shape such as a rectangle may be divided into three slices, with two end slices and a middle slice. If the rectangle is expanded horizontally, the end slices may retain their proportions while the pixels of the middle slice are stretched, repeated, or otherwise manipulated to fill the middle area as it expands. A similar approach may be used for vertical expansions, with three slices corresponding to the top, bottom, and middle of the rectangle, with the top and bottom slices retaining their proportions. Nine slices may facilitate both horizontal and vertical expansion—four corner slices retain their proportions, top and bottom slices stretch or repeat horizontally, end slices repeat or stretch vertically, while a center slice is repeated both horizontally and vertically. These and other slicing strategies may be used in applications that are used to edit images, but can also be used to present resizable components in applications, web pages, and the like.

SUMMARY

A computer-implemented method can comprise accessing a plurality of pixels representing an image and identifying at least two scanlines in the plurality of pixels. By analyzing the scanlines, a computing device carrying out the method can determine if the image is suited for slicing and, if the image is suited for slicing, the device can determine a slicing strategy by analyzing pixel values of the at least two scanlines. Data indicating the slicing strategy can be used to carry out a resizing operation and/or to generate structured code based on the slicing strategy, such as HTML and CSS code to generate a resizable element corresponding to the image. The slicing strategy can be determined independent of input defining or adjusting boundaries between slices.

This illustrative embodiment is discussed not to limit the present subject matter, but to provide a brief introduction. Additional embodiments include computer-readable media embodying a design application configured in accordance with aspects of the present subject matter, and also embodiments of computing devices adapted to provide a design application. These and other embodiments are described below in the Detailed Description. Objects and advantages of the present subject matter can be determined upon review of the specification and/or practice of an embodiment configured in accordance with one or more aspects taught herein.

BRIEF DESCRIPTION OF THE DRAWINGS

A full and enabling disclosure is set forth more particularly in the remainder of the specification. The specification makes reference to the following appended figures.

DETAILED DESCRIPTION

Figure 1:
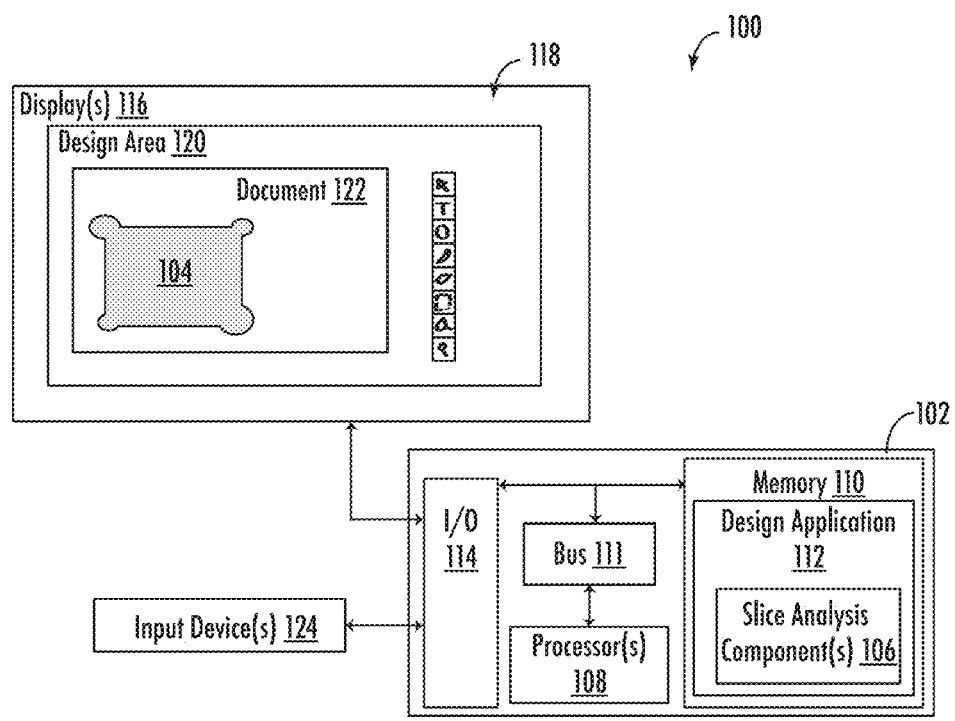
FIG. 1 is a diagram showing an illustrative computing system capable of determining a slicing strategy.

FIG. 1 is a diagram showing an illustrative system 100 featuring a computing device 102, which represents a desktop, laptop, tablet, or other computing system. As discussed in detail below, computing device 102 allows a user to specify an image 104 to be resized and computing device 102 attempts to determine a slicing strategy to facilitate resizing of the image. For example, the image may be intended for use in producing a resizable structured document (e.g., a document defined by HTML and CSS) without the need for the user to write code for the document or provide input defining structural details of the document. As another example, the image may be resized as part of designing a document, application, or for some other purpose that uses the resized image.

Computing device 102 is configured by one or more slicing analysis components 106 to determine whether image 104 is a candidate for slicing and, if so, to determine a slicing strategy such as one of the strategies 202, 204, 206 of FIG. 2. The slicing strategy may be used in carrying out a resizing operation directly and/or may be used in producing code of a structured document, executable or other application code, and/or rendering instructions for an interface in which an element corresponding to image 104 resizes in an appropriate manner.

Reference will now be made in detail to various and alternative exemplary embodiments and to the accompanying drawings. Each example is provided by way of explanation, and not as a limitation. It will be apparent to those skilled in the art that modifications and variations can be made. For instance, features illustrated or described as part of one embodiment may be used on another embodiment to yield a still further embodiment.

In the following detailed description, numerous specific details are set forth to provide a thorough understanding of the subject matter. However, it will be understood by those skilled in the art that the subject matter may be practiced without these specific details. In other instances, methods, apparatuses or systems that would be known by one of ordinary skill have not been described in detail so as not to obscure the subject matter.

As just mentioned, FIG. 1 shows an illustrative computing system 102, which can be a laptop, desktop, tablet, or some other computing device. Other examples include, but are not limited to, mobile devices (PDAs, smartphones, media players, gaming systems, etc.) and embedded systems (e.g., in vehicles, appliances, or other devices). Generally, system 102 can be referred to as a "data processing system," "computerized device," or simply "computer" and includes one or more hardware elements that implement a slicing analysis component in hardware and/or software. In this example, computing device 102 implements slice analysis component(s) 106 using a data processing element comprising one or more processors 108 and a memory 110 that includes a software implementation of slicing analysis component 106 (in this example, as part of a design application 112). However, slicing analysis component 106 (and/or design application 112) could be implemented using other processing elements, such as hardware-implemented logic like application-specific integrated circuits (ASICs), programmable logic arrays (PLAs), field programmable gate arrays (FPGAs), and the like configured to carry out program flow(s) according to the examples herein.

Memory 110 is interconnected via internal busses, connections, and the like indicated at 111. Bus 111 also connects to I/O interface(s) 114, such as universal serial bus (USB), VGA, HDMI, serial, and other I/O connections to other hardware of the computing system. The hardware also includes one or more displays 116. It will be understood that computing device 102 could include other components, such as storage devices, communications devices (e.g., Ethernet, R/F components), and other I/O components such as speakers, a microphone, or the like.

In this example, memory 110 embodies a design application 112 comprising one or more program components that configure the processor to provide a graphical interface 118 for output by display 116. As shown here, graphical interface 118 includes a design area 120 where a document 122 can be viewed or edited. For example, design application 112 may allow a user to design structured documents such as web pages (e.g., HTML documents) or to define interfaces and elements of cross-platform applications (e.g., Adobe® Flash® or AIR®) applications). As another example, design application 112 may allow a user to define raster or vector images and/or video content such as in Adobe® Photoshop® or Illustrator®. These and other Adobe products are available from Adobe Systems Incorporated of San Jose, Calif.

As a further example, design application 112 may comprise an application such as an Integrated Development Environment (IDE) used to develop application code for applications with one or more elements that are resizable and/or automatically resize for different display areas. For example, design application 112 may be used to develop an Adobe Flash® or AIR® application with code for one or more interface elements or other images that resize according to a slicing strategy determined by slice analysis component(s) 106. This may allow the interface elements or other images to resize appropriately for different screen areas (e.g., different display sizes, resolutions, of different device platforms).

As yet a further example, slice analysis component(s) 106 may not be included in a design application, but may be included in an application, operating system, or runtime environment that itself uses slice analysis component(s) 106 to score and determine an appropriate slicing strategy for causing interface elements or other images to resize, for instance in order to accommodate different screen areas.

Turning back to the example of design application 112, design area 120 may comprise a design canvas featuring various tools to specify and position elements of the document, commands to zoom, pan, and otherwise manipulate the view, set the desired page size, and otherwise specify a desired appearance of the resulting document. The interface may also allow the user to control the design application, set preferences, etc.

The program component(s) of design application 112 configure processor 108 to receive, via the graphical user interface, input defining a visual arrangement of content of document 122. For example, the input may be provided by one or more input devices 124, which can represent a keyboard, mouse, touch screen interface, and/or other input device(s). In response to the received input, processor 108 can render a view of the document in the design area. As shown here, the visual arrangement includes an image 104 as mentioned above, which may represent a button, container, or other desired element of a web page or other document being designed.

In some instances, the visual arrangement can be stored as a plurality of unstructured elements—that is, the elements may be defined in terms of desired appearance and location but without the need for the user to expressly define structural details of the document. However, document 122 may be intended to be a structured document (e.g., a document comprising HTML and CSS). Code of the document can be generated by other program components of application 112 that may, for example, determine a hierarchy of containers and generate corresponding HTML and CSS. Examples of such code generation can be found in U.S. patent application Ser. No. 12/908,427, filed Oct. 20, 2010 and entitled, "Methods and Systems for Producing Structured Documents," which is incorporated by reference herein in its entirety.

To provide a document that can resize in an appropriate manner, application 112 includes or communicates with slice analysis component 106, which programs computing device 102 to determine whether image 104 is a good candidate for slicing and, if so, to determine a slicing strategy. The slicing strategy can be used to generate code of the structured document so that one or more elements corresponding to image 104 resize in an appropriate manner.

The examples herein refer to "image 104." In practice, image 104 may represent a collection of visual elements that are, for purposes of the slicing analysis, treated as a single image. For example, the components of image 104 may comprise separate elements (e.g., different layers, different components in the same layer) that are intended for inclusion in the same frame. The slice analysis process may be carried out for each potential container/element identified in a document.

As another example, if design application 112 is not being used to generate a structured document, the slicing strategy can be used in providing a command to one or more other components of the design application 112 (or other application utilizing slice analysis component(s) 106) to carry out a resizing operation. The resizing operation can be carried out directly, or on-screen guides can be presented for final adjustment by a user prior to execution of the resizing operation.

Figures 2A, 2B, 2C:
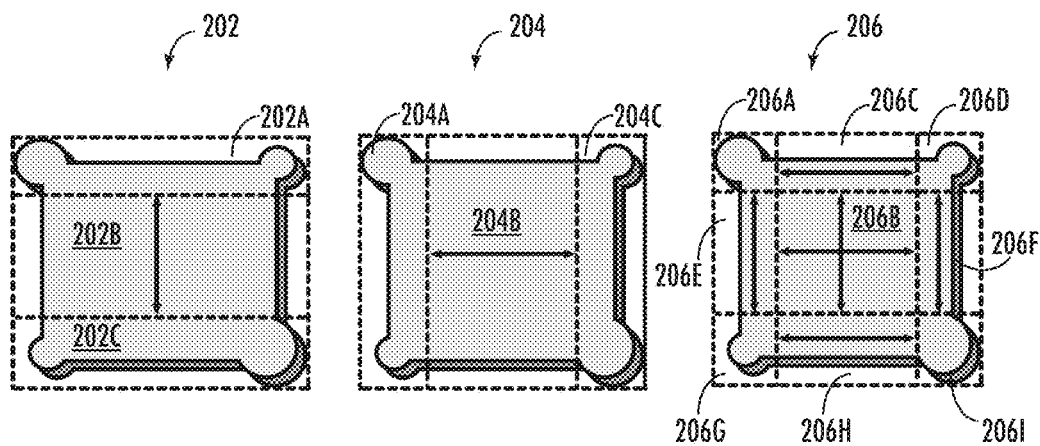
FIGS. 2A-2C show examples of slicing strategies.

FIGS. 2A-2C shows examples of slicing strategies. FIG. 2A shows a three-slicing strategy 202 defining a top slice 202A, middle slice 202B, and bottom slice 202C. This "vertical" 3-slice strategy allows the image to be expanded vertically—the content in slice 202B is repeated or stretched vertically while top slice 202A and bottom slice 202C remain fixed in size. For example, a horizontal line of pixels may transition from one color to another to define a vertical gradient. The line of pixels can be repeated vertically without affecting the gradient effect.

FIG. 2B shows a three-slicing strategy 204 defining end slices 204A/204C and middle slice 204B. This "horizontal" 3-slice strategy allows the image to be expanded horizontally—the content in slice 202B is repeated or stretched horizontally while end slices 204A/20C remain fixed in size. For example, a vertical line of pixels may transition from one color to another to define a horizontal gradient. The line of pixels can be repeated horizontally without affecting the gradient effect.

FIG. 2C shows a nine-slice strategy that allows for both horizontal and vertical expansion. Middle slice 206B is repeated or stretched both horizontally and vertically. Corner slices 206A, 206D, 206G, and 206I remain fixed in size. Top and bottom slices 206C and 206H stretch or repeat horizontally, while end slices 206E and 206F are repeated or stretched vertically.

The relative slice sizes shown here are for purposes of illustration only. For example, ends may be of different size or may even be omitted if the center slice extends to one or more edges of the image. Also, it will be understood that the "center" slice may actually lay off-center—for instance, a window element with a large icon in a corner may feature a large side or corner slice, with the "center" slice some distance away. Additionally, other slicing strategies using a different arrangement of fixed and repeating slices could be defined for various situations.

In some implementations, the overall goal is to use a slicing strategy where the variable slice is as large as possible for a given image—this means that smaller fixed slices can be used and smaller repeating image elements can be used. Accordingly, the minimum height of the element is defined by the fixed slices, so minimizing the size of the fixed slices (by maximizing the variable slice) results in more layout flexibility. On the other hand, if the variable slice is too large, the variable portions will dig into portions that should be fixed and result in an undesirable appearance.

Figure 3:
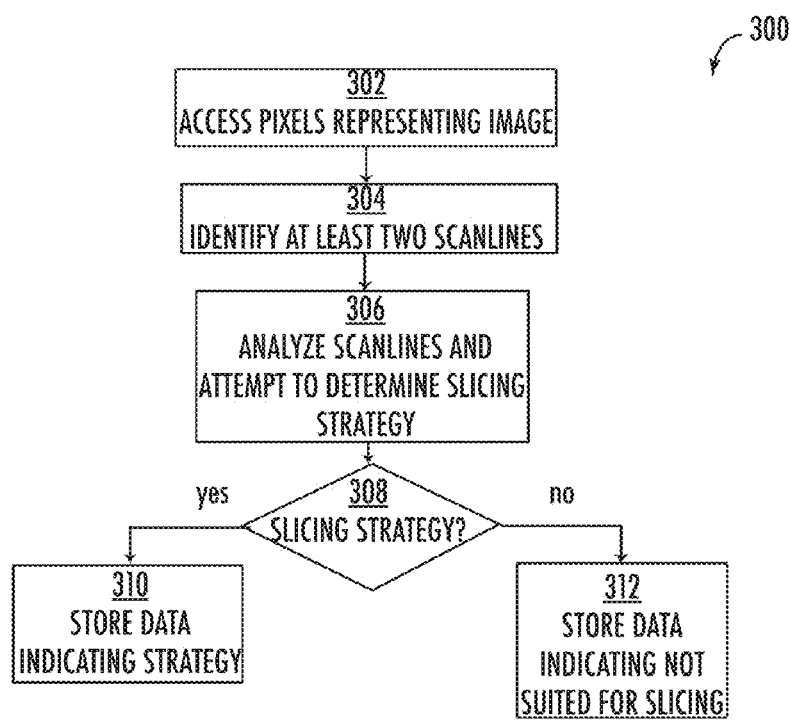
FIG. 3 is a flowchart showing steps of an illustrative method that can be carried out by a computing device to determine one or more slicing strategies.

FIG. 3 is a flowchart showing steps of an illustrative method 300 that can be carried out by a computing device to determine one or more slicing strategies. For example, method 300 or a variant thereof may be carried out by slice analysis component(s) 106 of FIG. 1. Block 302 represents accessing, data from a computer-readable medium and comprising a plurality of pixels representing an image. For example, the image may be defined in a graphical user interface of a design application, or may be provided by some other device to the device carrying out method 300. Block 304 represents identifying at least two scanlines in the plurality of pixels. As is known in the art, a "scanline" is a row of pixels in a raster graphics image and the scanlines can be identified by accessing the file or other data structure representing the image.

Block 306 represents determining if the image is suited for slicing and, if the image is suited for slicing, determining a slicing strategy by analyzing pixel values of the at least two scanlines. As explained below, one or more analysis techniques can be used to identify slicing strategies by generating a score or other indicator of suitability. The score or other indicator can also be used to determine whether a slicing strategy is a good idea at all. For example, irregular images (e.g., a box with a spiral or more complex pattern) may be ill-suited for slicing techniques that rely on stretching or repeating image portions to accommodate resizing operations/behaviors.

Blocks 310 and 312 represent storing data in response to analyzing the scanlines depending upon whether, at block 308, the method determines if a viable slicing strategy has been found. In particular, block 310 represents storing data indicating the slicing strategy if one has been determined, while block 312 represents storing data that the image is not suitable for slicing.

The stored data can be used for any purpose. For example, the slicing strategy may be used to generate structured code, such as HTML and CSS code, to generate an element corresponding to the image. As a particular example, different portions of the image (i.e., the different slices) may be defined as nested <DIV> or other elements, with the CSS code used to specify behavior (e.g., fixed, repeating, stretch/round (if supported)). Based on the slice boundaries and original image data, image portions (sprites) may be defined and saved at appropriate locations referenced by the CSS code.

As another example, the slicing strategy may be used to invoke a resizing operation supported by the device that carries out method 300. For example, a design application such as Adobe® Photoshop® may provide slice-based resizing of images, such as photographs, in response to parameters specifying the desired slices and strategy. The slicing strategy determined according to method 300 can be used when invoking the slice-based resizing function, either directly or to suggest a slicing strategy for confirmation/adjustment by a user. Although implementations can support user feedback regarding slice boundaries, it will be understood that method 300 allows for determining the slicing strategy independent of input defining or adjusting the boundaries.

Examples of analyzing pixels of an image are discussed below. The analysis techniques of FIGS. 4, 5, and 9 can be independently or together with one another at block 306 of FIG. 3 while analyzing scanlines.

Figure 4:
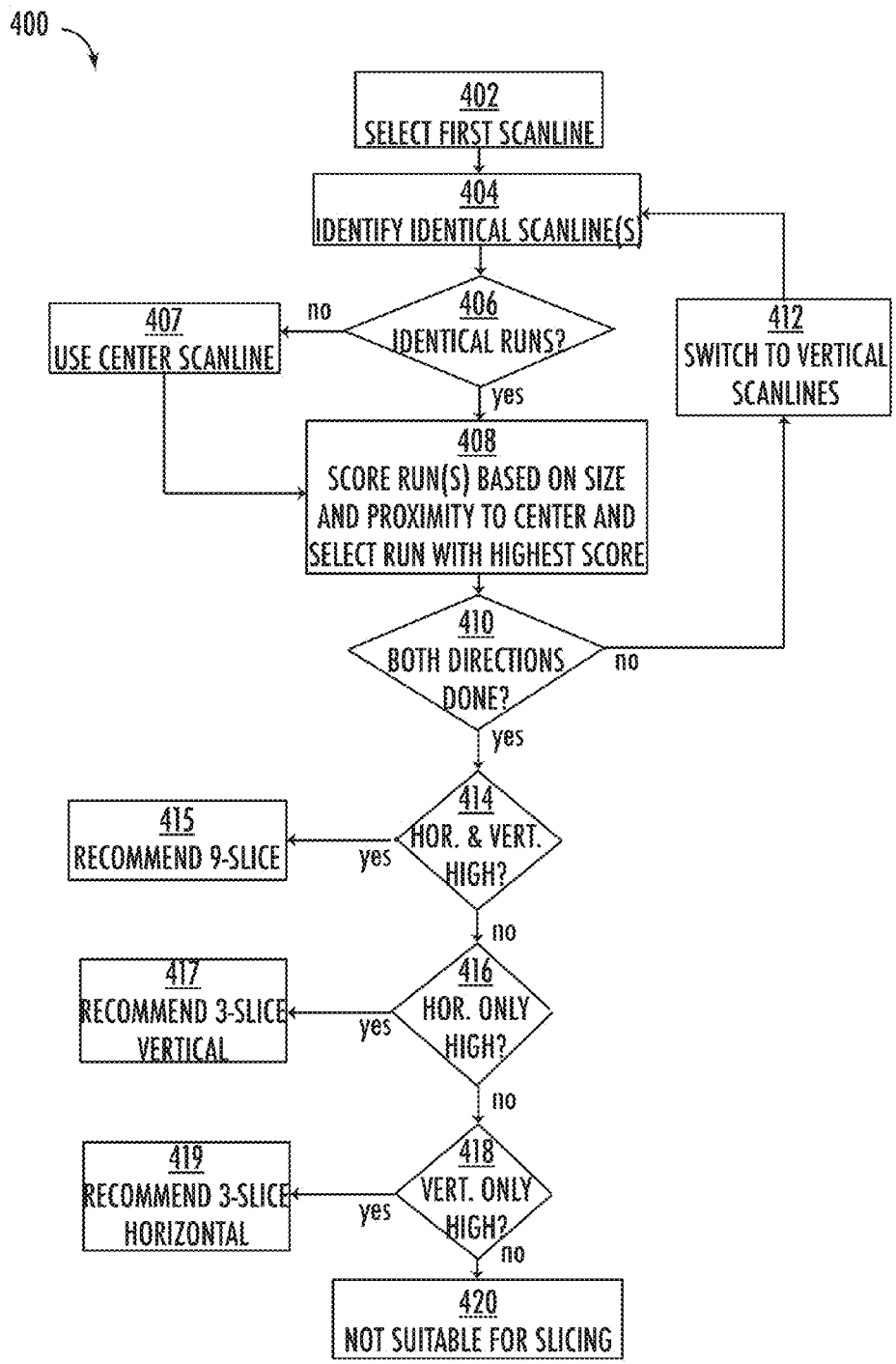
FIG. 4 is a flowchart showing an illustrative analysis technique.

FIG. 4 is a flowchart showing an illustrative analysis technique 400 that may, for example, be carried out at block 306 while analyzing scanlines to attempt to determine a slicing strategy. In this example, the slicing strategy is determined (at least in part) based on a horizontal score value and a vertical score value. Block 402 represents selecting a first scanline, such as the scanline at the top of the image. Block 404 represents identifying any scanlines identical to the first scanline. For example, each scanline can be considered in term and the pixel values within each respective scanline compared to one another.

Block 406 represents identifying one or more identical or near-identical horizontal runs, with a run being two or more adjacent pixels. As shown at 407, if no identical runs are found, a default scanline (in this example, the center scanline) can be used. However, if there are one or more runs of scanlines found at block 406, the method moves to block 408.

Block 408 represents generating a candidate score for each of the identified horizontal runs based on the run's size and proximity to a center of the image, selecting the run having highest score of the candidate scores, and using the selected run's candidate score value as the horizontal score. For example, the candidate score for a run can be calculated according to a function, such as by applying a multiplier value to the total number of pixels in the run, with an offset used to adjust the multiplier or final value, the offset representing on a difference between coordinates of the run and center coordinates of the image.

In one implementation, the function is linear (e.g., score=B*(length+A*offset)), where A is the relative weight of the offset as compared to the length (with both length and the offset measured in pixels) and B is the weighting factor of the candidate score that is used when comparing other scores coming from other heuristics. For example, if the offset is not desired to have as great an influence as the length, a small value can be used for "A." Of course, more complex linear functions or even nonlinear functions (e.g., quadratic, cubic, logarithmic, exponentials, etc.) could be used.

Block 410 represents determining if both horizontal scanlines and vertical scanlines have been analyzed. If not, in this example flow moves to block 412, which represents switching to an analysis of vertical scanlines at blocks 404-408. Of course, the method could analyze vertical and horizontal scanlines in any order.

Blocks 414-420 represent examples of determining a slicing strategy. For instance, at block 414, the method determines if both the horizontal and vertical scores are high. For example, each score could be compared to a threshold value (either the same value for both the horizontal and vertical score or a unique threshold value for each direction) and/or the scores could be compared to one another to determine if the scores are within a threshold value. If both scores are high, then at block 415 the method selects a 9-slice strategy. The 9-slice strategy can use an intersection of the selected horizontal run and the selected vertical run as a center slice.

If both the horizontal and vertical scores are not high, then the method considers potential 3-slice strategies. At block 416, the method determines whether only the horizontal score is high. If so, then at block 417 the method selects a 3-slice vertical strategy using the selected horizontal run as a middle slice. If the horizontal score is not high, then the method moves to block 418, which represents determining whether the vertical score is high. If the vertical score is high, then the method moves to block 419, which represents selecting a 3-slice horizontal strategy using the selected vertical run as a middle slice.

If neither the horizontal nor the vertical score is high, the method moves to block 420, which represents determining that the image is not suitable for slicing. This may result, for example, if default scanlines are selected at block 408 due to a lack of identical horizontal and vertical runs, or if horizontal and vertical runs that are present are of a small size and/or far from the image center.

In some implementations, the scanline comparison can be adjusted to reduce the effects of noise. For instance, after accessing the data comprising the plurality of pixels representing the image, a noise reduction filter can be applied to the data prior to identifying the at least two scanlines and analyzing the pixel values. For example, a copy of the image can be made and the noise reduction filter applied to the copy. Scanlines of the copy can be analyzed, but with the slices (if any) obtained from the original image.

Additionally or alternatively, the scanline comparison algorithm can allow for a degree of error in comparing scanlines to one another. For example, if an initial pass through the horizontal or vertical scanlines does not yield any matching scanlines, or yields a number of matching scanlines below a threshold value, an error threshold in the comparison algorithm can be adjusted to allow for inexact matches. For example, the error threshold may allow two scanlines to be considered "identical" so long as a number of mismatched pixels between the two scanlines falls below a threshold value. Additionally or alternatively, the error threshold may be used when comparing pixels to one another—two pixels with different values may be considered "identical" so long as the pixel values fall within an error threshold.

Each time the error threshold(s) are increased, a corresponding parameter in the scoring algorithm can be adjusted downward so that larger error thresholds impact the overall score negatively.

Additionally or alternatively, a run of identical pixels can be used in the slicing strategy rather than a single pixel at the intersection of a horizontal and vertical run (for 9-slicing) or single scanlines (for 3-slicing). For example, a 9-slice strategy may use an intersection of the largest run of identical horizontal scanlines and the largest run of identical vertical scanlines. Similarly, the runs of horizontal and vertical scanlines can be used for 3-slice vertical and 3-slice horizontal strategies, respectively.

In some implementations, after the recommended slicing strategy is determined, code can be generated to provide a resizable element using the slicing strategy. For example, HTML and CSS code can be generated to define DIV elements corresponding to the different slices, with the image portions and repeating behavior controlled through CSS—the image portions can be specified using the background attribute with width and height, with the repeating behavior controlled via repeat-x/repeat-y so that the variable slices will fill accordingly.

In some cases, additional options may be available. For example, if the element is to be included in a document rendered by a device that recognizes CSS3, the "stretch" and "round" attributes can be used for an improved appearance. For example, a constant pixel value can be stretched, rounded, or repeated with no loss of quality. On the other hand, a gradient (change from one color to another over a relatively long sequence of pixels) can be stretched with minimal loss of quality but cannot be rounded or repeated (in the direction of the color change). On the other hand, a relatively large repeating pattern can be rounded with minimal loss of quality.

Figure 5:
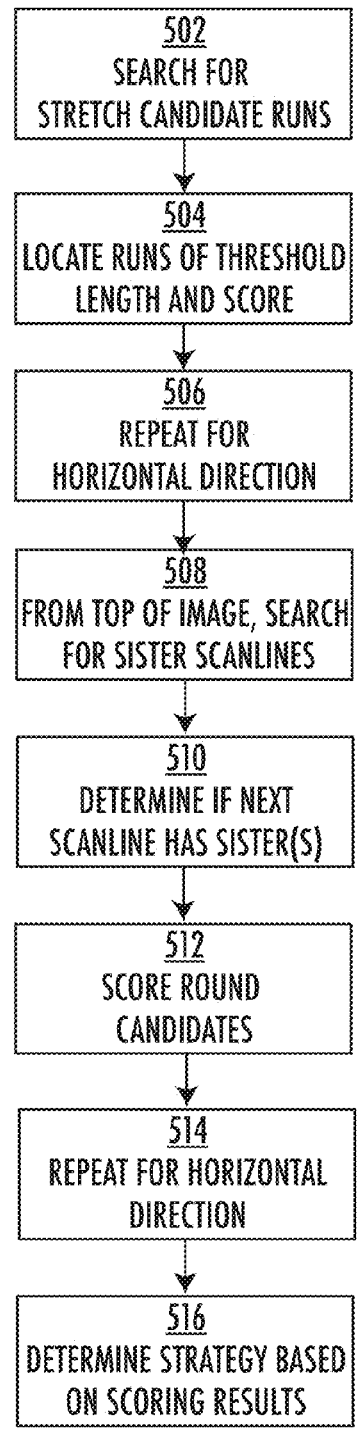
FIG. 5 is a flowchart showing another illustrative analysis technique.

FIG. 5 is a flowchart showing another illustrative analysis technique 500 that may be useful when CSS3 code is to be generated or when the slicing strategy is to be applied in another situation in which stretching or rounding is an option when resizing is to occur. Method 500 searches for candidates to stretch or round, and can be carried out at block 306 of FIG. 3, for example. Method 500 could be carried out after method 400—for instance, after a slicing strategy is determined, method 500 could be used to determine if stretching or rounding is an option for one or more of the slices.

Blocks 502-506 generally represent identifying whether one or more portions of the image can be stretched. At block 502, the method searches for stretch candidate runs, which are runs of scanlines where pixel values from one scanline to the next are either unchanging or smoothly changing. For example, starting in a row of pixels at the top of the image, a pixel in each vertical scanline can be compared to a horizontally-adjacent pixel (in an adjacent scanline). By comparing the adjacent scanlines, the method can identify at block 504 a stretch candidate, which includes at least one run of scanlines of a threshold length in which each pixel of the run is within an error range of a neighbor pixel in an adjacent scanline. Then, each run can be scored based on a size of the run as compared to a size of the image and the run's proximity to a center of the image.

Figure 6:
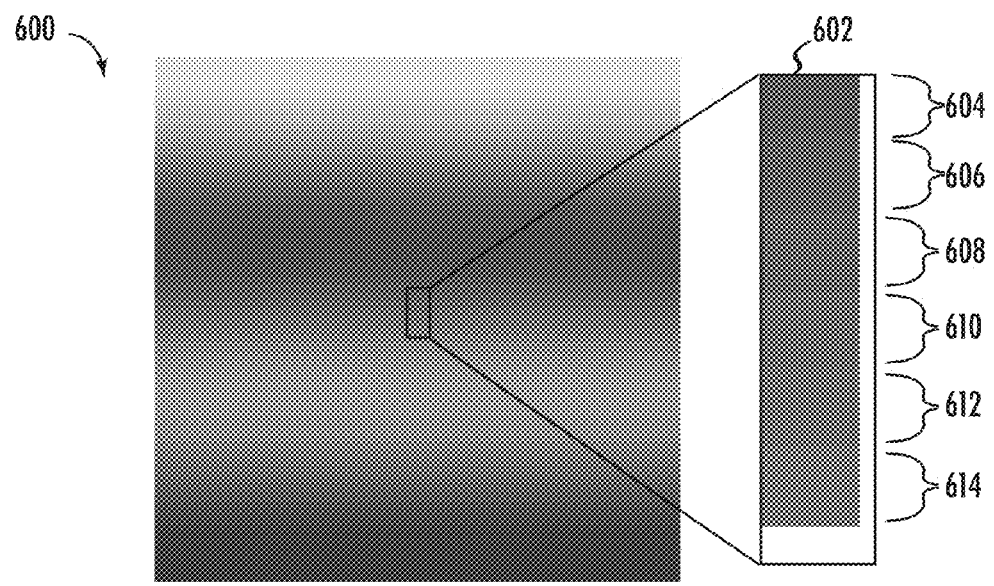
FIG. 6 shows an example of a set of scanlines suitable for stretching.

FIG. 6 shows an example of a set 600 of scanlines suitable for stretching. The gradient effect shown in FIG. 6 is achieved using scanlines with small delta values as between adjacent scanlines. This can be seen in comparing the horizontal scanlines in the vertical run 602 in the exploded view, any two adjacent horizontal scanlines (604, 606, 608, 610, 612, 614) are very similar (but not identical) shades of gray (or another color). Thus, the set of scanlines can be stretched vertically with few artifacts. Of course, the set can be repeated horizontally as well—for instance, the entire gradient may be defined as a single vertical scanline.

Turning back to FIG. 5, as shown at block 506, steps 502 and 504 can be repeated for the horizontal direction—for example, starting from the left side or right side of the image, a column of pixels can be analyzed to identify horizontal scanlines in which pixels in adjacent scanlines are either unchanging or smoothly changing. In this example, stretch and round candidates are both identified as part of method 500. However, once stretch candidates are found, the method could select a corresponding 3-slice or 9-slice strategy including at least one stretched slice.

Returning to FIG. 5, blocks 508-514 represent identifying a round candidate by determining whether the image includes runs of sister scanlines. The sister scanlines can be an indication of a repeating pattern that is suitable for rounding such as set 700 of scanlines shown in FIG. 7.

Figure 7:
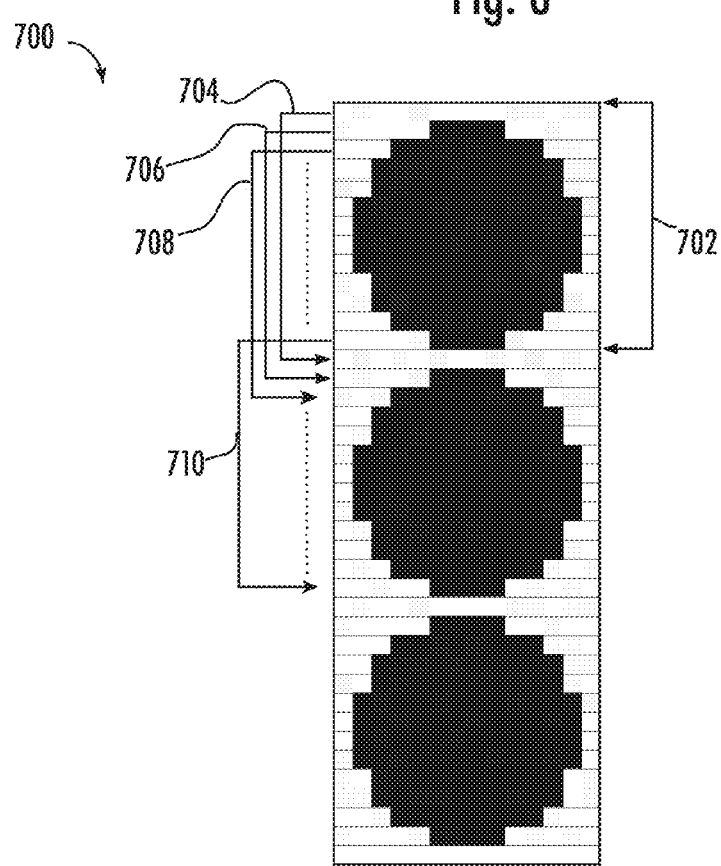
FIG. 7 shows an example of a round candidate.

Block 508 of FIG. 5 represents searching for sister scanlines. This can be carried out by selecting a first scanline and searching, within a range of candidate scanlines, for a first sister scanline to the first scanline. The candidate range may be, for example, a scanline between and 100 pixels away from the first scanline. The first sister scanline can be a scanline which, when compared pixel-to-pixel with the first scanline, results in a total pixel value error below a threshold value. In FIG. 7, the first scanline and its sister scanline are paired as shown at 704.

Block 510 represents determining if the next scanline also has a sister scanline at the same relative distance. In particular, if a first sister scanline is found, the method can determine a relative distance between the first scanline and the first sister scanline. Then, starting from a second scanline adjacent the first scanline the image can be searched at the relative distance for a second sister scanline that is a sister scanline to second scanline. This process can be repeated for all of the scanlines between the first scanline and the first sister scanline. If each scanline between the first scanline and the first sister scanline also has a sister scanline at the relative distance, the portion of the image containing the sister scanlines can be considered a round candidate. This is shown in FIG. 7, where sister scanlines 706, 708, and scanlines between (not labeled in FIG. 7) through the pair shown at 710 are all the same relative distance apart.

Block 512 represents scoring each round candidate based on its total size relative to a size of the image and determining the round candidate having the highest score. Block 514 represents repeating blocks 508-512 for vertical scanlines (or for horizontal scanlines, if the method started with vertical scanlines).

Figure 8:
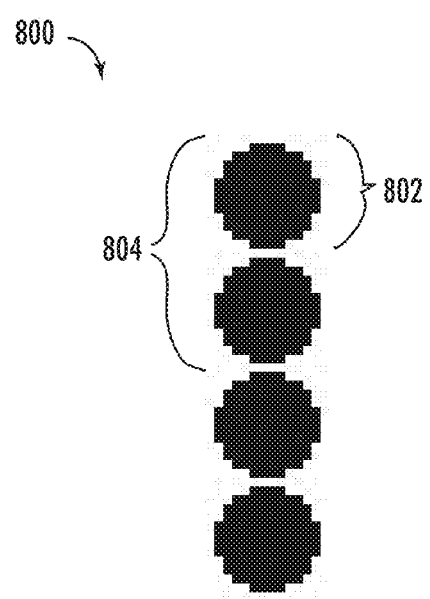
FIG. 8 shows an example of how round candidates can be compared to one another.

FIG. 8 shows how analysis of sister scanlines can result in identifying numerous round candidates. For instance, the overall pattern 800 is 52 pixels high and as shown in FIG. 8 can be described as four repeats of round candidate 802 (at 13 pixels high) or two repeats of round candidate 804 (at 26 pixels high). Some implementations can favor the candidate with the smallest round candidate size—in this example, 802 would be favored because it uses a smaller repeated image.

Turning back to FIG. 5, block 516 represents determining the slicing strategy by determining whether stretch and/or round candidates were found for each axis. For example, if a round candidate was found when analyzing vertical scanlines, a 3-slice horizontal strategy can be selected, with the run repeated in the horizontal direction but with the "round" attribute used so that a complete iteration of the pattern is used. If a round candidate was found for both the horizontal and vertical directions, a 9-slice strategy can be used. When choosing between stretch and round, the larger feature wins—that is, the candidate with the largest number of pixels can be identified and the slicing strategy determined based on that candidate. The best candidate may be identified based purely on size and/or the candidate's score may be considered.

In some implementations, noise reduction can be used as part of the analysis. For example, a copy of the image can be made and a noise reduction filter (e.g., a low-radius blur or other algorithm) can be applied to diminish noise below a threshold value. An analysis in accordance with FIG. 5 can then be carried out, but using an error threshold when comparing scanlines and/or pixel values to one another. As mentioned above, the scoring algorithm can use a weighting factor so that as the error threshold increases, the corresponding score decreases. As also noted above, the noise-reduced image can be used to identify the slicing strategy but the original image can be used for the actual slice images.

Figure 9:
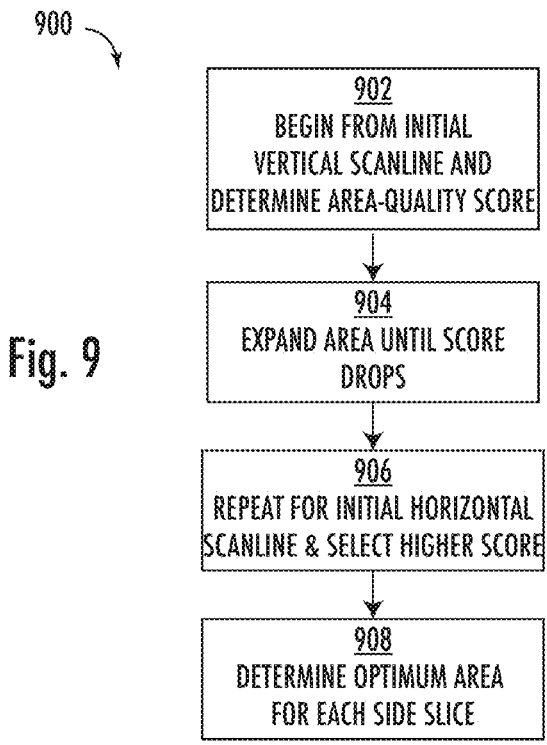
FIG. 9 is a flowchart showing a further illustrative analysis technique.

FIG. 9 is a flowchart showing a further illustrative analysis technique 900 that may be applied during slice analysis step 306 of FIG. 3. In this analysis technique, the slicing strategy is determined by analyzing different portions of the image to determine whether different repeat types (stretch, round, repeat) can be used in different slices of an image. FIG. 9 is discussed alongside FIGS. 10A-10C.

The analysis begins by locating the most effective "center" 3-slicing strategy. Some implementations can use an exhaustive search of every possible subrectangle of the image. However, to conserve computing time/resources, a simpler approach can be used. As shown at block 902, an area-quality score can be determined starting from a scanline (in this example the center vertical scanline) and applying an analysis technique based on one or more of FIG. 4 or 5, treating the scanline as the image and determining a 3-slice strategy. An area-quality score can be determined based on the highest quality score for the slicing strategy multiplied by the number of pixels.

Figure 10A:
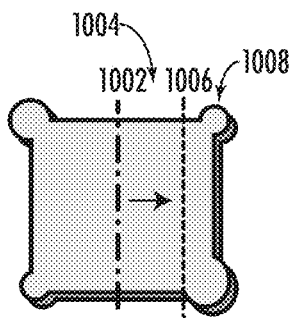
FIGS. 10A-10C illustrate an example of analyzing an image to determine a slicing strategy.

Block 904 represents expanding the area under consideration until the area-quality score drops. As shown in FIG. 10A, starting from vertical scanline 1002, the area is expanded until line 1006 is reached. Area 1004 between lines 1002 and 1006 is suitable for repeating to allow horizontal expansion in a vertical 3-slice strategy, but area 1008 should not be included in the center slice because repeating those portions would not result in a good appearance (and, due to a lack of runs of identical vertical scanlines in 1008, the resulting score is not high).

Figure 10B:
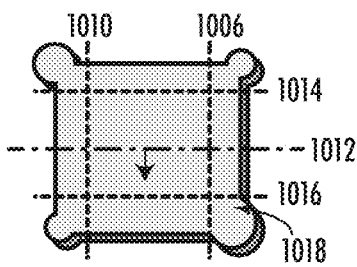

Turning back to FIG. 9, block 906 represents repeating blocks 902 and 904 for an initial horizontal scanline and then selecting the higher-scoring of the horizontal and vertical areas. As shown in FIG. 10B, the vertical analysis resulted in slice boundaries 1006 and 1008. Starting from horizontal scanline 1012, the area under consideration is expanded outward until scanline 1016. Beyond line 1016 (in area 1018), a horizontal 3-slice strategy would be inappropriate due to the features of the image that cannot be repeated. Thus, scanline 1016 represents a boundary and the expansion also is performed upward from line 1012 to identify boundary 1014.

The higher-scoring area becomes the center 3-slice of an overall 9-slice. In the event of a tie or areas having very close scores, the winner may be selected randomly; in this case, the resulting areas are approximately the same and result in area 1020 shown in FIG. 10C.

Figure 10C:
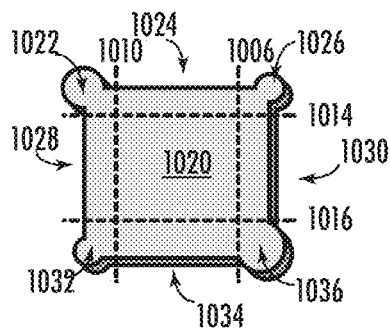

After the "center" slice is identified, the same analysis can be applied to the top, bottom, left, and right "side" slices to determine an optimum 3-slicing for that side as shown at block 908. As shown in FIG. 10C, side slices 1024, 1028, 1030, and 1034 can be analyzed to determine whether those slices should be stretched, repeated, or rounded. Because this is a 9-slice strategy, areas 1022, 1026, 1032, and 1036 are assumed to be fixed (i.e., no repeat). Additionally, although this example shows four side slices, in practice there may be fewer side slices if the center slice reaches the image edges.

General Considerations

Some portions of the detailed description were presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here and generally is considered to be a self-consistent sequence of operations or similar processing leading to a desired result. In this context, operations or processing involve physical manipulation of physical quantities.

Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels.

Unless specifically stated otherwise, as apparent from the foregoing discussion, it is appreciated that throughout this specification discussions utilizing terms such as "processing," "computing," "calculating," "determining" or the like refer to actions or processes of a computing platform, such as one or more computers and/or a similar electronic computing device or devices, that manipulate or transform data represented as physical electronic or magnetic quantities within memories, registers, or other information storage devices, transmission devices, or display devices of the computing platform.

Embodiments of the methods disclosed herein may be performed in the operation of computing devices. The order of the blocks presented in the examples above can be varied—for example, blocks can be re-ordered, combined, and/or broken into sub-blocks. Certain blocks or processes can be performed in parallel.

Embodiments also include the computing devices themselves as configured according to the present subject matter. Examples of computing devices include, but are not limited to, servers, personal computers, mobile devices (e.g., tablets, smartphones, personal digital assistants (PDAs), etc.) televisions, television set-top boxes, portable music players, and consumer electronic devices such as cameras, camcorders, and mobile devices. Computing devices may be integrated into other devices, e.g. "smart" appliances, automobiles, kiosks, and the like.

A computing device can include any suitable arrangement of components that provide a result conditioned on one or more inputs. Suitable computing devices include, but are not limited to, multipurpose microprocessor-based computer systems accessing stored software from one or more non-transitory computer-readable media, the software comprising instructions that program or configure the computing system from a general-purpose computing apparatus to a specialized computing apparatus capable of implementing one or more embodiments of the present subject matter.

When software is utilized, the software may comprise one or more components, processes, and/or applications, and any suitable programming, scripting, or other type of language or combinations of languages may be used to implement the teachings contained herein in the software used in programming or configuring a computing device. Any suitable non-transitory computer-readable medium or media may be used to implement or practice the presently-disclosed subject matter, including, but not limited to, diskettes, drives, magnetic-based storage media, optical storage media (e.g., CD-ROMS, DVD-ROMS, and variants thereof), flash, RAM, ROM, and other memory devices. Additionally or alternatively to software, the computing device(s) may comprise circuitry such as application-specific integrated circuits (ASICs), programmable logic arrays (PLAs), and the like that render the device (s) operative to implement one or more of the methods of the present subject matter.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed:

1. A computer-implemented method, comprising:
    accessing, by a processor, data from a computer-readable medium and comprising a plurality of pixels representing an image;
    identifying, by the processor, at least two scanlines in the plurality of pixels;
    determining, by the processor, if the image is suited for slicing by carrying out at least one scoring operation;
    identifying one or more identical or near-identical horizontal runs;
    identifying one or more identical or near-identical vertical runs, wherein a run is determined to be nearly identical to another run when a number of mismatched pixels between the runs is less than an error threshold;
    based on determining that the image is suited for slicing, determining a slicing strategy based on one or more of a horizontal score value and a vertical score value by analyzing pixel values of the at least two scanlines, wherein analyzing the pixel values comprises generating a candidate score for each of the identified runs, the candidate score for each run generated based at least in part on the run's size and the run's proximity to a center of the image; and
    storing, by the processor, data in the computer-readable medium, the stored data indicating the slicing strategy, if any, or indicating that the image is not suited for slicing.

2. The method of claim 1, further comprising:
    generating structured code based on the slicing strategy.

3. The method of claim 2, wherein the structured code comprises HTML and CSS code to generate an element corresponding to the image.

4. The computer-implemented method of claim 1, wherein determining the slicing strategy comprises determining boundaries between a plurality of slices independent of input defining or adjusting the boundaries.

5. The computer-implemented method of claim 1, wherein the slicing strategy is determined based on the horizontal score value and the vertical score value, and wherein analyzing the pixel values comprises:

selecting the horizontal run having the highest score of the candidate scores and using the selected run's candidate score value as the horizontal score; and selecting the vertical run having the highest score of the candidate scores and using the selected run's candidate score value as the vertical score.

6. The computer-implemented method of claim 5, wherein determining the slicing strategy comprises:

determining that the image is not suitable for slicing if neither the horizontal score value nor the vertical score value exceeds a threshold value;

selecting a 9-slice strategy using an intersection of the selected horizontal run and the selected vertical run as a center slice if both the horizontal score value and the vertical score value exceed a threshold value;

selecting a 3-slice vertical strategy using the selected horizontal run as a middle slice if only the horizontal score value exceeds a threshold value; and selecting a 3-slice horizontal strategy using the selected vertical run as a middle slice if only the vertical score value exceeds a threshold value.

7. The computer-implemented method of claim 6, further comprising:

after accessing the data comprising the plurality of pixels representing the image, applying a noise reduction filter to the data prior to identifying the at least two scanlines and analyzing the pixel values.

8. The computer-implemented method of claim 1, wherein the slicing strategy is determined based on identifying whether one or more portions of the image can be stretched, and wherein analyzing the pixel values comprises:

comparing scanlines to identify at least one run of pixels of a threshold length in which each pixel of the run is within an error range of a neighbor pixel;

scoring the run based on a size of the run as compared to a size of the image and the run's proximity to a center of the image; and determining that the portion of the image containing the run is a stretch candidate if the score of the run exceeds a threshold value.

9. The computer-implemented method of claim 8, further comprising determining whether a stretch candidate was found for each of a horizontal and vertical axis and selecting a corresponding 3-slice or 9-slice strategy including at least one stretched slice.

10. The computer-implemented method of claim 1, wherein the slicing strategy is determined based on identifying whether one or more portions of the image can be rounded, and wherein analyzing the pixel values comprises:

selecting a first scanline and searching, within a range of candidate scanlines, for a first sister scanline to the first scanline, the first sister scanline being a scanline which, when compared pixel-to-pixel with the first scanline, results in a total pixel value error below a threshold value;

if a first sister scanline is found, determining a relative distance between the first scanline and the first sister scanline and determining, for each scanline between the first scanline and the first sister scanline, whether the scanline also has a sister scanline at the relative distance;

if each scanline between the first scanline and the first sister scanline has a sister scanline at the relative distance, storing data indicating that a portion of the image containing the sister scanlines is a round candidate;

for each round candidate, scoring the round candidate based on its total size relative to a size of the image; and determining the round candidate having the highest score.

11. The computer-implemented method of claim 10, further comprising if a stretch candidate was also identified during analyzing, determining a size of the stretch candidate, determining a size of the round candidate having the highest score, selecting which of the stretch and round candidates that has the highest score, and using the selected candidate to determine a corresponding 3-slice or 9-slice strategy.

12. The computer-implemented method of claim 1, wherein determining the slicing strategy comprises defining an area corresponding to the first scanline, determining a 3-slicing strategy for the area, determining an area-quality score, and adding a scanline to the area until the area-quality score drops below a threshold.

13. The computer-implemented method of claim 1, further comprising resizing the image according to the slicing strategy if the image is suitable for slicing.

14. A system, comprising:

a non-transitory computer-readable medium; and processing hardware implementing a slice analysis component configured to:

determine if an image accessed from the computer-readable medium is suited for slicing;

based on determining that the image is suited for slicing, determine a slicing strategy based on identifying whether one or more portions of the image can be stretched by analyzing pixel values of at least two scanlines in the image and comparing the scanlines to identify at least one run of pixels of a threshold length in which each pixel of the run is within an error range of a neighbor pixel, wherein analyzing the pixel values comprises:

scoring the run based on a size of the run as compared to a size of the image and the run's proximity to a center of the image; and store data in the computer-readable medium indicating the slicing strategy, if any, or data indicating that the image is not suited for slicing.

15. The system of claim 14, wherein the slicing strategy is determined based on a horizontal score value and a vertical score value, and wherein analyzing the pixel values comprises:

identifying one or more identical or near-identical horizontal runs;

generating a candidate score for each of the identified horizontal runs, the candidate score for each identified horizontal run generated based on the run's size and the run's proximity to a center of the image;

selecting the horizontal run having the highest score of the candidate scores and using the selected run's candidate score value as the horizontal score;

identifying one or more identical or near-identical vertical runs;

generating a candidate score for each of the identified vertical runs, the candidate score for each identified vertical run generated based on the run's size and the run's proximity to a center of the image; and selecting the vertical run having the highest score of the candidate scores and using the selected run's candidate score value as the vertical score.

16. The system of claim 14, wherein analyzing the pixel values comprises:

determining that the portion of the image containing the run is a stretch candidate if the score of the run exceeds a threshold value.

17. The system of claim 14, wherein the slicing strategy is determined based on identifying whether one or more portions of the image can be rounded, and wherein analyzing the pixel values comprises:
- selecting a first scanline and searching, within a range of candidate scanlines, for a first sister scanline to the first scanline, the first sister scanline being a scanline which, when compared pixel-to-pixel with the first scanline, results in a total pixel value error below a threshold value;
- if a first sister scanline is found, determining a relative distance between the first scanline and the first sister scanline and determining, for each scanline between the first scanline and the first sister scanline, whether the scanline also has a sister scanline at the relative distance;

for each scanline between the first scanline and the first sister scanline, determining whether the scanline also has a sister scanline at the relative distance;
- if each scanline between the first scanline and the first sister scanline has a sister scanline at the relative distance, storing data indicating that a portion of the image containing the sister scanlines is a round candidate;
- for each round candidate, scoring the round candidate based on its total size relative to a size of the image; and determining the round candidate having the highest score.

18. The system of claim 14, wherein determining the slicing strategy comprises defining an area corresponding to the first scanline, determining a 3-slicing strategy for the area, determining an area-quality score, and adding a scanline to the area until the area-quality score drops below a threshold.

19. A computer program product comprising a non-transitory computer-readable medium embodying program code, the program code comprising:
- program code for accessing a plurality of pixels representing an image;
- program code for identifying at least two scanlines in the plurality of pixels;
- program code for determining if the image is suited for slicing;
- program code for, based on determining that the image is suited for slicing, determining a slicing strategy based on:
  - identifying whether one or more portions of the image can be rounded by analyzing pixel values of the at least two scanlines to determine a score, wherein analyzing the pixel values comprises selecting a first scanline and searching, within a range of candidate scanlines, for a first sister scanline to the first scanline, the first sister scanline being a scanline which, when compared pixel-to-pixel with the first scanline, results in a total pixel value error below a threshold value; and
  - if a first sister scanline is found, determining a relative distance between the first scanline and the first sister scanline and determining, for each scanline between the first scanline and the first sister scanline, whether the scanline also has a sister scanline at the relative distance; and
- program code for storing data indicating the slicing strategy, if any, or indicating that the image is not suited for slicing.

20. The computer program product of claim 19, further comprising:
- program code for providing a graphical user interface;
- program code for receiving input defining the accessed image in the graphical user interface; and
- program code for generating HTML and CSS code defining a resizable element based on the image and the slicing strategy.

21. The computer program product of claim 20, wherein determining the slicing strategy comprises determining boundaries between a plurality of slices independent of input defining or adjusting the boundaries.

22. The computer program product of claim 19, further comprising:
- program code suitable for using the slicing strategy, if any, to resize the image across a plurality of differently-sized display areas.

* * * * *

UNITED STATES PATENT AND TRADEMARK OFFICE
CERTIFICATE OF CORRECTION

PATENT NO.       : 9,002,139 B2                              Page 1 of 1
APPLICATION NO.  : 13/028470
DATED            : April 7, 2015
INVENTOR(S)      : Matt J. Phillips and David C. Stephens It is certified that error appears in the above-identified patent and that said Letters Patent is hereby corrected as shown below:

In the Claims

Column 14, Claim 14, Lines 33-34

Delete ", wherein analyizing the pixel values comprises"

Insert --;--

Signed and Sealed this
Fourth Day of August, 2015

Michelle K. Lee
*Director of the United States Patent and Trademark Office*